UNITED STATES PATENT OFFICE.

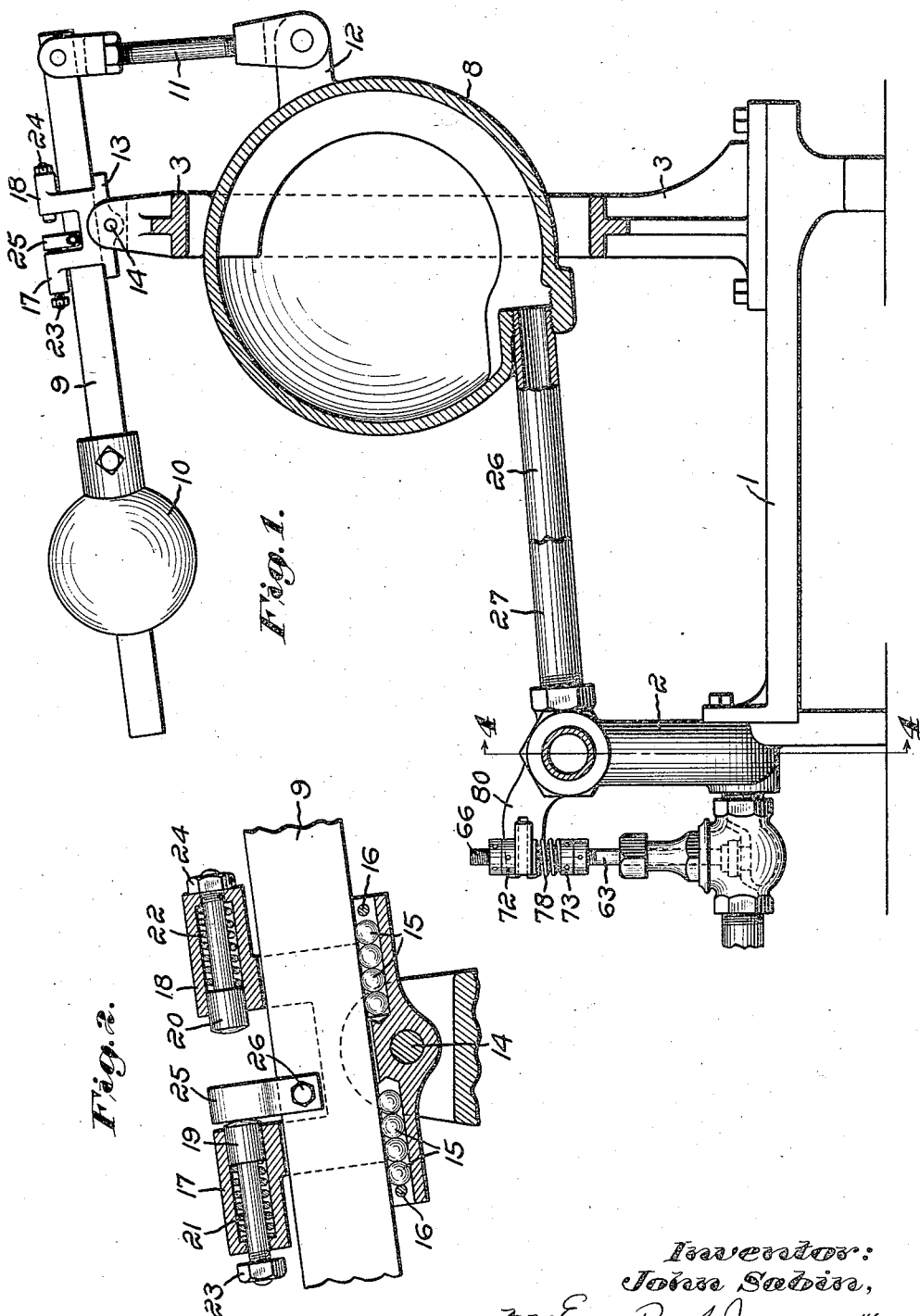

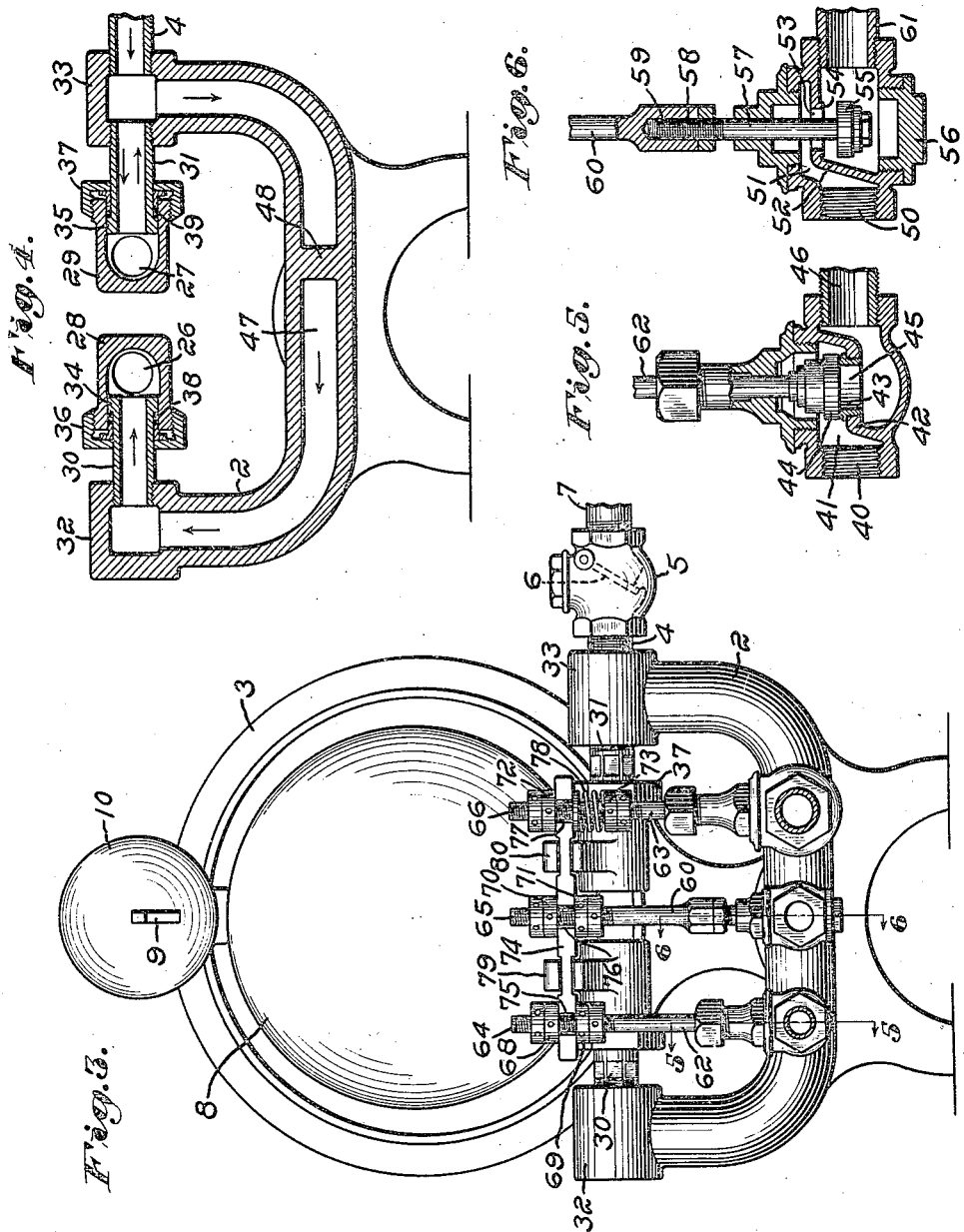

JOHN SABIN, OF NASHUA, NEW HAMPSHIRE, ASSIGNOR TO NASHUA MACHINE COMPANY, INC., OF NASHUA, NEW HAMPSHIRE, A CORPORATION OF NEW HAMPSHIRE.

STEAM TRAP.

1,425,340.

Specification of Letters Patent. Patented Aug. 8, 1922.

Application filed February 9, 1921. Serial No. 443,670.

*To all whom it may concern:*

Be it known that I, JOHN SABIN, a citizen of the United States, and a resident of Nashua, in the county of Hillsborough and State of New Hampshire, have invented an Improvement in Steam Traps, of which the following description, in connection with the accompanying drawings, is a specification, like characters on the drawings representing like parts.

This invention relates to steam traps, and it has among other objects the provision of a simple and effective construction and mode of operation of the controlling valves and the leverage control of the weighted lever.

In order that the principle of the invention may be readily understood, I have disclosed a single embodiment thereof in the accompanying drawings, wherein—

Fig. 1 is a view partly in side elevation and partly in vertical section of a steam trap embodying my invention;

Fig. 2 is a detail in vertical section of the leverage control for the weighted lever;

Fig. 3 is a view of the steam trap in end elevation;

Fig. 4 is a vertical section upon the line 4—4 of Fig. 1;

Fig. 5 is a view in vertical section taken through the steam valve; and

Fig. 6 is a similar view taken through the vent valve.

Referring more particularly to the drawings, the illustrative steam trap there shown as embodying the invention comprises a frame including a tripod 1 for supporting the various parts of the trap and partial rings or yokes 2, 3 rising therefrom and preferably bolted thereto at opposite ends of the tripod. The partial ring or yoke 2 is hollow and has connected therewith a water-of-condensation feed pipe 4 provided with a valve casing 5 containing a check valve 6. The inlet leading into the valve casing 5 is a pipe 7 leading from the usual source of supply and which is preferably the water of condensation from the boiler. The trap or receiver which may be of spherical or other desired form is indicated at 8 in Figs. 1 and 3. The tilting of the bowl 8 is preferably governed by means of a lever 9 having an adjustable weight 10, said lever being connected by a link 11 with an ear 12 on the bowl 8. The construction of weighted lever and link is such that the operation of the trap is rendered desirably prompt and actively responsive to predetermined conditions of water in the bowl 8.

In order to render the bowl very sensitive, in order to quicken the tilting action thereof and also in order to absorb the shock of the tilting movement, I have provided means, one form of which I will now proceed to describe without limiting myself thereto.

The upper end of the ring 3 constitutes a pivotal support for a rocking member 13, which, as indicated most clearly in Figs. 1 and 2, is pivoted to the said ring 3 at 14. The said rocking member 13 is of general tubular or sleeve-like form, as indicated in said Figs. 1 and 2, and receives therein for longitudinal sliding as well as rocking movement, the weighted lever 9. Desirably the said rocking member 13 is channeled or recessed for the reception of balls 15, thus providing an anti-friction support and permitting the longitudinal movement of the lever 9 with a minimum amount of friction. The balls 15 are held in position by confining transverse pins 16 at the ends of said rocking member. Preferably integral with said rocking member and as herein shown at the upper side of the weighted lever 9, I provide an oppositely positioned pair of sockets 17, 18 receiving therein plungers 19, 20, which are spring pressed toward each other by relatively strong springs 21, 22. The plungers 19, 20 extend at their outer ends through the said sockets 17, 18 and are there threaded for the reception of nuts 23, 24, holding the plungers within the sockets. The weighted lever 9 has formed therewith or preferably secured thereto an abutment 25, herein represented as a separate piece bolted as indicated at 26 to the lever 9.

In the rocking movement of the lever 9, the abutment 25 is brought into contact with the heads of the plungers 19, 20 alternately, and the springs 21, 22 absorb all shock due to the tilting movement of the bowl. I am thus enabled to do away with the separate shock absorbers, which have heretofore been resorted to and which are not only cumbersome in construction but uncertain in operation. The springs 21, 22 not only absorb the shock of tilting movement, but each of said springs tends to move the weighted lever 9 longitudinally so as to assist in bringing it into such a longitudinal position relative to the pivotal point 14 that it will hasten the lowering of the bowl from its raised position to its lowered position, and vice versa from its lowered position to its raised position.

It will be evident that with the abutment 25 in contact with either plunger 19, 20, the spring 21, 22 is very greatly compressed, and therefore tends to expand, and thus move the abutment 25. This tendency of each spring to expand under these conditions is resisted by the abutment 18 and the momentum of the weighted lever 9, but as the weighted lever 9 is brought more nearly into a horizontal position, the stress of the spring that is under compression finally overcomes the weight or resistance of the abutment 25 and the weighted lever 9, with the result that the lever 9 is forced longitudinally along the rocking member 13, and thus the tilting of the lever 9 is hastened and consequently the movement of the bowl is hastened.

When the bowl 8 is in its up position, as shown in Fig. 1, the abutment 25 contacts with the head of the plunger 19. When the bowl tilts or moves downwardly, the rocking of the lever 9 results in the contact of the abutment 25 with the head of the plunger 20.

The bowl 8 is provided with a pair of tubes 26, 27, both of said tubes being indicated only in Fig. 4. The said tubes connect the bowl 8 with the elbow tubes 28, 29 journaled upon tubular bearings 30, 31, herein represented as pipes threaded at their outer ends into upstanding ends 32, 33 of the ring or yoke member 2. By this arrangement the bowl 8 may tilt for filling and after emptying the same. The trunnion tubes 30, 31 are provided at their inner ends with flanges 34, 35 between which and caps 36, 37 packing rings 38, 39 are positioned.

The water, which may be water of condensation from the boiler, enters through the pipe 7 passing the check valve 6 and then enters the upper end 33 of the partial ring or yoke 2 through the pipe 4, as indicated most clearly in Fig. 4. The water then passes through the trunnion tube 31 into the pipe 27 leading into the bottom of the bowl 8 and accumulates therein until finally the tilting of the bowl is effected.

The live steam from the steam space of the boiler or from other suitable source enters through the passage indicated at 40 in Figs. 3 and 5 and into the valve casing 41. Within said valve casing is a valve partition 42 having a bushing 43 constituting a seat for the valve 44. When the valve is opened, the steam passes through the opening 45 into the pipe 46, and thence into the passage 47 of the partial ring or yoke 2. The steam then enters the trunnion tube 30 and the pipe 26, by which it is conveyed to the upper part of the bowl 8 above the water of condensation therein, thus assisting in discharging the water from said bowl when the latter is lowered.

The water of condensation from the bowl passes out through the pipe 27 and thence through an arm of the partial ring or yoke 2 in the direction of the arrows shown in Fig. 4, through the trunnion tube 31 and downwardly toward the partition 48, the water being prevented from passing out through the water inlet 4 by reason of the check valve 6. The discharge of the water from the bowl is controlled by a valve similar in construction to the steam valve 44, indicated in dotted lines only at 49 in Fig. 1.

I have thus far described a valve for controlling the inlet of steam and a valve for controlling the water outlet. It has heretofore been proposed to provide a vent with a valve therefor controlling the escape of air from the bowl as shown for example in the patent to Frank A. Littlefield, No. 1,153,125, September 7, 1915, and in the patent to myself No. 1,259,909.

In such cases, however, the vent controlling valve is directly connected with the steam inlet controlling valve, and in such a way that the vent is of restricted area. The result has been that the bowl has not been vented properly under all conditions of operation. To overcome this difficulty, I have provided a wholly separate vent controlling valve and the vent thus controlled is separately connected with the trap, and in such a way as to vent the same quickly and satisfactorily. For this purpose and as shown most clearly in Figs. 3 and 6, the partial ring or yoke 2 is in communication through the passage 47, shown in Fig. 4, with a passage 50, itself leading into a valve casing 51 having therein a partition 52 provided with an opening 53 forming a valve seat 54 for the reception of a vent valve 55. The valve casing 51 has threaded thereinto at the bottom a cap 56, by removal of which the valve 55 may be readily removed, and herein by reason of the fact that the stem 56 of said valve is threaded, as indicated at 58, at its upper end into an internally threaded socket 59 of the main part 60 of the valve stem. This divided construction permits the removal for any purpose of the vent valve, although the casing therefor is quite close to the floor, as indicated in Fig. 3. Leading from the valve casing 51 is a pipe 61 communicating with the atmosphere and permitting the discharge from the vent of the air from the bowl. The steam valve 44 is provided with an upright stem 62, and the water outlet valve 49 is provided with an upright stem 63. I provide suitable means whereby all of said valves, namely, the steam inlet valve 44, the vent valve 55 and the water outlet valve 49 are operated by the tilting movement of the bowl. For this purpose, I have herein positioned the stem 62 of the steam inlet valve, the stem 60 of the vent valve and the stem 63 of the water outlet valve in parallelism and have threaded the upper ends thereof as indicated at 64, 65, 66 for the reception of lock nuts 68, 69, 70, 71, 72 and 73 respectively. Between the respective sets of lock nuts, I provide a cross bar or member 74 provided, as indicated in Fig. 3, with three semi-circular or open recesses 75, 76, 77, through which pass the stems 62, 60 and 63 of said valves, as indicated most clearly in Fig. 3. The construction and arrangement of the parts is such that the said cross bar or member 74 cannot be displaced, but can be readily removed if desired. Preferably I provide a coil spring 78 between the lock nuts 73 and the said cross members 74.

In order to operate the said cross bar or member 74 by the tilting movement of the trap, I preferably provide the elbow members 28, 29 with ears or lugs 79, 80 shown in Figs. 1 and 3, said ears or lugs being slotted to embrace the said cross bar or member 74.

When the bowl 8 is in its elevated position, indicated in Fig. 1, the water outlet valve 49 and the steam valve 44 are closed, but the vent valve 55 is open. This is evident from the fact that the water outlet and steam inlet valves are located above their seats, whereas the vent valve is located below its seat. When the bowl 8 is down, then the steam inlet valve 44 and the water outlet valve 49 are open, but the vent valve 55 is closed.

Claims:

1. A steam trap comprising a movable bowl, a tilting lever therefor, and a movable sleeve for said lever in which the latter has capacity for longitudinal movement.

2. A steam trap comprising a movable bowl, a tilting lever therefor, and a support for the pivot of said lever, said support having shock absorbing means for the lever.

3. A steam trap comprising a movable bowl, a tilting lever therefor, and a support for said lever permitting longitudinal movement of said lever, said support having shock absorbing means and also having anti-friction means for the movement of the lever.

4. A steam trap comprising a movable bowl, a tilting lever therefor, and a rocking support for said lever permitting longitudinal movement of said lever, said support having anti-friction means and also having shock absorbing means for the movement of said lever.

5. A steam trap comprising a movable bowl, a tilting lever therefor, and a movable support 13 for said lever, said support 13 carrying both anti-friction means and shock absorbing means for said lever.

6. A steam trap comprising a movable bowl, a tilting lever therefor, a sleeve 13 for said lever in which said lever has capacity for lengthwise movement and a ring 3 to which said support is pivoted.

7. A steam trap comprising a movable bowl, a tilting lever therefor, a support 13 in which the lever has capacity for longitudinal movement, a ring 3 to which said support is pivoted, and shock absorbing means 17, 18, 19, 20 carried by said support.

8. A steam trap comprising a movable bowl, a tilting lever therefor, a support 13 for said lever in which the latter has capacity for longitudinal movement, a ring 5 to which the support is pivoted, anti-friction means 15 for said lever and shock absorbing means 17, 18, 19, 20 and abutment 25 carried by the lever.

9. A steam trap comprising a movable bowl, a yoke having a partition therein, a water outlet passage on one side of said partition, a steam inlet passage on the other side of said partition, separate steam inlet and air vent valves at the same side of said partition, a water outlet valve at the other side of said partition, and separate connections from each of said valves for operating the same by the movement of the bowl.

10. A steam trap comprising in combination a movable bowl, a supporting yoke therefor having passages for water and steam, separate steam inlet, air vent and water outlet valves in communication with passages in said yoke, and separate connections from each of said valves for operating the same by the movement of the bowl.

11. A steam trap comprising a movable bowl, a supporting yoke therefor, a water inlet passage and a steam outlet passage, a steam inlet valve, an air vent valve and a water outlet valve, all arranged in substantially lateral alignment, said valves being in communication with said yoke, and connections from each of said valves adapted to be operated by the movements of the bowl.

12. A steam trap comprising a movable bowl, a supporting yoke therefor having water and steam passages, steam inlet, air vent and water outlet valves, all in communication with said yoke and arranged side by side, a valve stem extending upwardly from each of said valves, cross member engaging each of said valve stems, and means to move said cross member up and down by movement of said bowl.

13. A steam trap comprising a tilting bowl, a yoke therefor having steam inlet and outlet passages, a partition separating said passages, a steam inlet valve and an air vent valve at one side of said partition and in communication with a passage in said yoke, a water outlet valve at the outer side of said partition and in communication with another passage in said yoke, a valve stem extending upwardly through each of said valves, a cross member engaging each of said stems, and means movable with said bowl to engage said cross member and impart movements to said valves.

14. A steam trap comprising a tilting bowl, a yoke therefore having steam inlet and water outlet passages, separate steam inlet, air vent and water outlet valves in communicaton with passages in said yoke, stems extending upwardly from said valves, a cross member engaging all of said stems, and means movable with the tilting movements of said bowl to close the water inlet valve and the steam inlet valve and open air vent valve simultaneously, and conversely to open the steam inlet valve and the water outlet valve and to close the air vent valve simultaneously.

15. A steam trap comprising a movable bowl, a tilting lever therefor, a support in which the lever has capacity for longitudinal movement, means on which said support is mounted, and shock absorbing means carried by said support.

16. A steam trap comprising a movable bowl, a tilting member therefor, a support in which said member has capacity for longitudinal movement, means on which said support is mounted, and shock absorbing means carried by said support.

17. A steam trap comprising a movable bowl, a tilting element therefor, a sleeve in which said element has capacity for longitudinal movement, means on which said sleeve is mounted, and shock absorbing means carried by said sleeve.

18. A steam trap comprising a movable bowl, a tilting element therefor, a sleeve in which said element has capacity for longitudinal movement, means on which said sleeve is mounted, and anti-friction means for said element, and shock absorbing means therefor, both carried by said sleeve.

In testimony whereof, I have signed my name to this specification.

JOHN SABIN.

Witnesses:
 F. C. SABIN,
 CHAS. W. HEBERT.